(12) United States Patent
Curtis et al.

(10) Patent No.: US 6,614,566 B1
(45) Date of Patent: Sep. 2, 2003

(54) PROCESS FOR HOLOGRAPHY INVOLVING SKIP-SORTED HOLOGRAM STORAGE

(75) Inventors: Kevin Richard Curtis, New Providence, NJ (US); Adrian John Hill, Gillette, NJ (US); Michael C Tackitt, Califon, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 271 days.

(21) Appl. No.: 09/588,908

(22) Filed: Jun. 7, 2000

(51) Int. Cl.[7] ................................................. G03H 1/28
(52) U.S. Cl. ........................ 359/24; 359/25; 365/125; 365/216; 369/103
(58) Field of Search ............................ 359/22, 24, 25, 359/10; 365/125, 216; 369/103

(56) References Cited

U.S. PATENT DOCUMENTS

| | | | |
|---|---|---|---|
| 4,021,606 A | * | 5/1977 | Takeda ........................ 359/22 |
| 5,007,690 A | * | 4/1991 | Chern ........................ 359/11 |
| 5,671,073 A | * | 9/1997 | Psaltis et al. ................. 359/22 |
| 5,719,691 A | | 2/1998 | Curtis et al. |
| 5,793,504 A | | 8/1998 | Stoll |
| 5,874,187 A | | 2/1999 | Colvin et al. |
| 5,892,601 A | | 4/1999 | Curtis et al. |
| 6,055,174 A | * | 4/2000 | Zhou .......................... 365/125 |

OTHER PUBLICATIONS

Psaltis, D. et al., "Holographic Memories," *Scientific American* (1995).
*Optics Letters*, vol. 20, No. 7, 782–784 (1995).
Gu, C. et al., "Noise gratings formed during the multiple exposure schedule in photorefractive media," *Optics Comm.*, vol. 93, 213–18 (1992).
Pu, A. "Holographic 3–D Disks and Optical Correlators Using Photopolymer Materials," Doctoral Dissertation, Demetri Psaltis, Thesis Advisor, California Institute of Tech. pp. 119–123 (1997).

* cited by examiner

*Primary Examiner*—John Juba
*Assistant Examiner*—Leo Boutsikaris

(57) ABSTRACT

The invention relates to a skip-sorted spatial multiplexing holographic storage technique that addresses the problems of cross-talk, image distortions, and physical change of the medium encountered in current recording processes in which photopolymer media are used. The skip-sorted technique involves storing holograms in layers of arrays, such that a substantially uniform background exposure is provided for subsequent layers.

11 Claims, 4 Drawing Sheets

PROCESS FOR HOLOGRAPHY INVOLVING SKIP-SORTED HOLOGRAM STORAGE

BACKGROUND OF THE INVENTION

1. Field of the Invention

The invention relates to page-wise storage systems, in particular holographic storage systems.

2. Discussion of the Related Art

Developers of information storage devices and methods continue to seek increased storage capacity. As part of this development, page-wise memory systems, in particular holographic systems, have been suggested as alternatives to conventional memory devices. Holographic systems typically involve the storage and readout of entire pages of information, these pages consisting of arrayed patterns representing information. In general, a holographic system stores, in three dimensions, holographic representations of the pages as patterns of varying refractive index and/or absorption imprinted into a storage medium. Holographic systems are discussed generally in D. Psaltis et al., "Holographic Memories," *Scientific American*, November 1995.

Holographic systems are characterized by their high density storage potential and the potential speed at which the stored information is randomly accessed and retrieved. In fact, because information is typically manipulated, i.e., stored and retrieved, on a page-by-page basis, the speed of storage and retrieval compares favorably to conventional magnetic disk or compact disk storage systems. A significant advantage of holographic systems, however, is storage capacity. It is possible for each page stored as a holographic image to contain thousands or even millions of elements. Theoretically, it is believed that at the present time, up to $10^{14}$ bits of information are storable in approximately 1.0 cm$^3$ of holographic storage medium.

FIG. 1 illustrates the basic components of a holographic system 10. System 10 contains a modulating device 12, a photorecording medium 14, and a sensor 16. Modulating device 12 is any device capable of optically representing data in two-dimensions. Device 12 is typically a spatial light modulator that is attached to an encoding unit which encodes data onto the modulator. Based on the encoding, device 12 selectively passes or blocks portions of a beam reflecting off or passing through device 12. In this manner, a signal beam 20 is encoded with a data image. The image is stored by interfering the encoded signal beam 20 with a reference beam 22 at a location on or within photorecording medium 14. The interference creates an interference pattern (or hologram) that is captured within medium 14 as a pattern of, for example, varying refractive index. It is possible for more than one holographic image to be stored at a single location, or for holograms to be stored in overlapping positions, by, for example, varying the angle, the wavelength, or the phase of the reference beam 22 (generally referred to as angle, wavelength, and phase correlation multiplexing, respectively). Signal beam 20 typically passes through lens 30 before being intersected with reference beam 22 in the medium 14. It is possible for reference beam 22 to pass through lens 32 before this intersection. Once data is stored in medium 14, it is possible to retrieve the data by intersecting reference beam 22 with medium 14 at the same location and at the same angle, wavelength, or phase at which reference beam 22 was directed during storage of the data. The reconstructed data passes through lens 34 and is detected by sensor 16. Sensor 16 is, for example, a charged coupled device or an active pixel CMOS sensor. Sensor 16 typically is attached to a unit that decodes the data.

One method of holographic storage is phase correlation multiplex holography, which is described in U.S. Pat. No. 5,719,691 issued Feb. 17, 1998. In one embodiment of phase correlation multiplex holography, a reference light beam is passed through a phase mask, and intersected in the recording medium with a signal beam that has passed through an array representing data, thereby forming a hologram in the medium. The position of the medium relative to the signal and reference beams is changed to allow the data to be stored at overlapping areas in the medium. The data is later reconstructed by passing a reference beam through the original storage location with the same phase modulation used during data storage. It is also possible to use volume holograms as passive optical components to control or modify light directed at the medium, e.g., filters or beam steerers. Other techniques that store data by using motion of the media relative to the beams include aperture multiplexing (see U.S. Pat. No. 5,892,601) and shift multiplexing (see *Optics Letters*, Vol. 20, No. 7, 782–784 (1995)). Phase correlation, aperture, and shift multiplexing all involve storing holograms in different locations, but with some overlap between them.

As individual data pages are laid down in multiplexing space, there is a limit to how close together the holograms can be recorded without encountering cross-talk during read-out. However, even when sufficient space is provided between holograms, it is possible for cross-talk noise to be introduced into a given hologram during the readout and/or recording of neighboring holograms. Techniques have therefore been developed in an effort to reduce or avoid such introduced cross-talk. One technique—sparse recording—is useful for angle, wavelength, and phase code multiplexing techniques, i.e., techniques in which holograms have nearly the same physical location. In sparse recording, holograms that are stored at very close angles or wavelengths to each other are stored in an order distinct from their sequential angular or wavelength displacement. For example, if holograms are to be multiplexed at angles of 1°, 2°, 3°, 4°, 5°, 6°, 7°, 8°, 9°, and 10°, the holograms may be stored in an actual sequence such as 1°, 9°, 4°, 2°, 6°, 3°, 7°, 10°, 5°, and 8°. This lessens the cross-talk between holograms. (See C. Gu and J. Hong, "Noise gratings formed during the multiple exposure schedule in photorefractive media," *Optics Comm.*, Vol. 93, 213–18 (1992).) While sparse recording tends to be useful, it is also relatively complex, particularly during readout. Moreover, it's usefulness, as noted above, is primarily for techniques that involve nearly complete physical overlap of holograms.

In addition to this potential cross-talk problem, degradation of stored holograms can also occur due to local changes in a medium's refractive index and physical dimensions. Specifically, in photopolymer-based media, photoactive monomers and/or oligomers are selectively reacted to form holograms, and this polymerization tends to induce some local shrinkage. Thus, each successive hologram storage induces additional physical changes in the overall medium, e.g., changes in the bulk index and the extent of diffusion. These additive changes can introduce significant distortion when reading out the holograms, i.e., Bragg detuning of the holograms. In addition, photopolymer media tend to have finite dynamic range, i.e., index change. And, for spatial multiplexing techniques, photopolymer media tend to exhibit non-uniform recording across the medium, thereby inducing degradation of the stored data. (Spatial multiplexing, as used herein, indicates that the multiplexing technique involves changes to location of the medium relative to the signal and reference beams, and that the holograms have some overlap between them.) Advantageously, the holographic storage technique is designed to compensate for such changes.

Thus, holographic storage techniques that substantially reduce problems associated with cross-talk and with physical changes in storage media, particular photopolymer media, are desired.

SUMMARY OF THE INVENTION

The invention relates to a skip-sorted spatial multiplexing technique that addresses problems inherent in photopolymer media, including cross-talk and physical change of the medium. Such spatial multiplexing techniques include shift, phase correlation, and aperture multiplexing. Skip-sorted refers to a storage technique in which a uniform background exposure of the photopolymer medium is provided by storing holograms in certain positional sequences. By using such sequences, the problems typically encountered with photopolymer media, discussed above, tend to be alleviated.

According to one aspect of the invention, illustrated in FIGS. 2A to 2C, a first set of holograms 10, 12 are stored in a substantially planar first row such that each hologram just touches the next, i.e., the centers of adjacent holograms are located approximately one hologram diameter apart. (A hologram diameter is distance defined by the intersection of the reference and signal beams in the plane of the recording medium.) After this first set of holograms is stored, a second set of holograms 20, 22 are stored in the same row, but the second set is shifted from perfect alignment with the first set of holograms by an offset distance. It is also possible to store subsequent sets of holograms in this first row, similarly shifted from perfect alignment with the previous set by the offset distance. (Row is used in its conventional sense and indicates holograms that are arranged in a configuration one hologram wide and one beside the next, either in a straight line or in some other configuration, e.g., a circular configuration in a circular medium—see FIGS. 2A–2D, 3A, 3B, 4A, and 4B. Perfect alignment is where the centers of the first and second set of holograms have the same position.)

This offset distance is typically an integer multiple of the spatial multiplexing shift desired in the completed recording medium, as discussed in more detail below. By forming a set of substantially non-overlapping holograms, the background for storage of subsequent sets is relatively stable, compared to more conventional storage techniques, e.g., polymeric shrinkage has taken place relatively uniformly across the row.

Where more than one row of holograms is desired, according to another aspect of the invention, first and second sets of holograms (or additional sets) are stored as shown in FIGS. 2A and 2B. Then, as shown in FIG. 2C, a third set (30, 32) of holograms are formed in a second, substantially planar row adjacent to the first row. Specifically, the third set is arranged such that the center of each hologram (30) is approximately one hologram diameter from adjacent holograms of the third set (32), and also approximately one hologram diameter from the center of an adjacent hologram of the first set (10). The fourth set (40, 42) is then also stored in the second row (with the centers of the holograms also spaced one hologram diameter apart). But, like the second set, the fourth set (40, 42) is shifted from perfect alignment with the third set of holograms (30, 32) by the same offset distance. Again, it is possible to form additional sets in each row, each set similarly shifted from perfect alignment with the previous set by the offset distance.

While the storage of sequential sets of edge-to-edge holograms has been discussed in other contexts, there has been no disclosure or motivation to use such a technique with photopolymer media. Instead, through careful analysis of the problems inherent in photopolymer media, it was discovered that a layered storage approach would be advantageous.

Specifically, the Ph.D. thesis "Holographic 3-D Disks and Optical Correlators using Photopolymer Materials" by Allen Pu from the California Institute of Technology discusses storage of holograms in overlapping rows in lithium niobate. Careful consideration of the thesis shows that there would have been no motivation to extend Pu's approach to photopolymer media. Chapter 3.4 of the thesis (pages 143–178) describes an experiment in which storage of 100 bits/$\mu m^2$ was being sought. As noted on page 144, because a suitable photopolymer medium was not available, lithium niobate—a photorefractive material—was used instead. Initial experiments, as discussed at pages 156–158, encountered problems with the shift holography technique illustrated in FIG. 3.59(a)—the process of recording sequentially overlapping holograms in the photorefractive storage material caused at least partial erasure of previously-recorded holograms. Specifically, storage of each individual hologram decayed the strength of holograms previously recorded in that space (see page 156), and did so in a non-uniform manner. This problem detrimentally reduced the signal to noise ratio, particularly for the holograms in which erasure was most prevalent.

To address this erasure problem, which is unique to photorefractive materials, the thesis reports a particular storage technique, illustrated in FIG. 3.60(a). The technique involved recording sets of non-overlapping holograms in a row, such that an overlapping array as represented in FIG. 3.59(a) is ultimately achieved. This arrangement, by avoiding sequential overlap, allowed attainment of a more uniform erasure. However, erasure still occurred, and to reach similar diffraction efficiencies for all the holograms, the first holograms were recorded at the highest strength, with each subsequent set recorded at a lower strength.

As is apparent from the thesis and the above discussion, Pu was addressing an erasure problem unique to photorefractive materials. No such erasure occurs in photopolymer media. Thus, there would have been no reason to carry over this technique, which would be considered unnecessarily complex, to systems using photopolymer media.

DETAILED DESCRIPTION OF THE INVENTION

Figure 1:
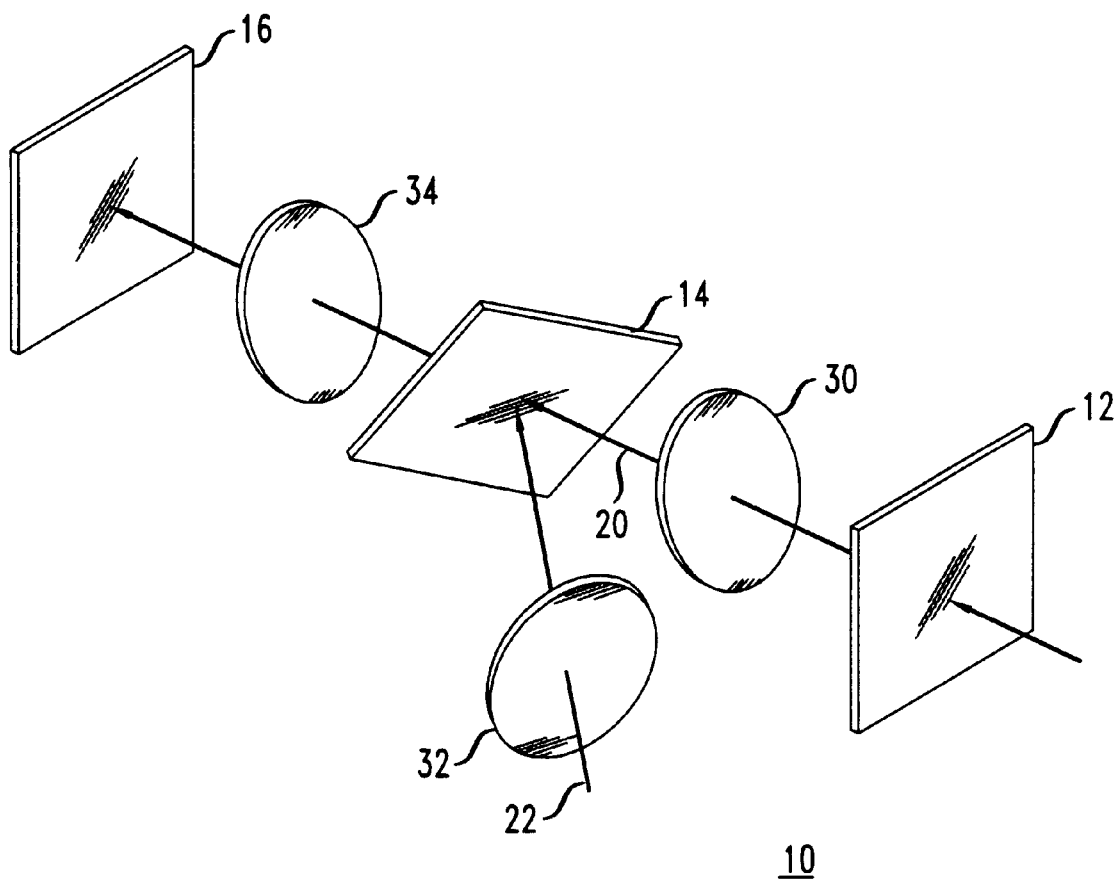
FIG. 1 shows the basic features of a holographic storage system.
Figure 2A:
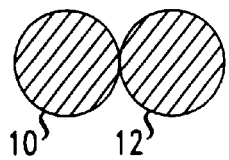
FIGS. 2A–2D illustrate an embodiment of the invention.
Figure 2B:
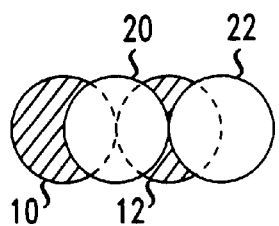
Figure 2C:
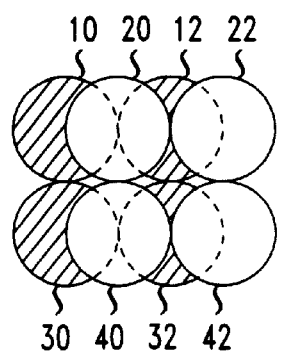

According to one aspect of the invention, holograms are stored in a rectangular or square pattern, illustrated in FIGS. 2A to 2D. A first set of holograms 10, 12 are stored in a substantially planar first row such that each hologram just touches the next, i.e., the centers of adjacent holograms are located approximately one hologram diameter apart. Then a second set of holograms 20, 22 are stored in the first row. But the second set 20, 22 is shifted from perfect alignment with the first set of holograms 10, 12 by an offset distance. Subsequent sets in the first row, similarly shifted from perfect alignment with the previous set by the same offset distance, are also possible. It is possible for the holograms of an individual set to be spaced closer than one hologram distance—typically the spacing will be at least 2% of the hologram diameter, more typically at least 50%. The actual distance depends on tradeoffs made for the particular holographic system, since greater spacing increases uniformity but also slows the speed of the system.

Where more than one row of holograms is desired, according to another aspect of the invention, sets of holograms are stored in a first row as shown in FIGS. 2A and 2B. Then, as shown in FIG. 2C, a third set of holograms 30, 32 are formed in a second row—typically adjacent to the first row. For example, the third set is typically arranged such that the center of each. hologram (30) is approximately one hologram diameter from adjacent holograms of the third set (32), and also approximately one hologram diameter from the center of an adjacent hologram (10) of the first set. (In addition to having the third and fourth rows immediately adjacent the first and second rows, it is possible for the third and fourth rows to be located closer, e.g., overlapping a portion of the first and second.) The fourth set of holograms 40, 42 is then stored in the second row, but, like the second set, the fourth set 40, 42 is shifted from perfect alignment with the third set of holograms 30, 32 by the same offset distance. Again, it is possible to store additional sets in the second row, similarly shifted from perfect alignment with the previous set by the offset distance.

Figure 2D:
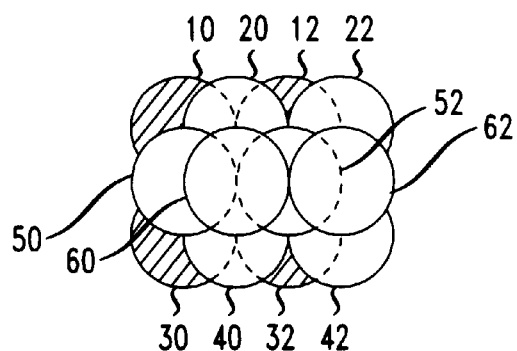

Once a desired number of adjacent rows, such as the first and second row of FIGS. 2A–2C, are formed, it is possible to form sets of holograms in rows that overlap such adjacent rows. For example, as shown in FIG. 2D, a fifth set of holograms 50, 52 is stored in a third row that is substantially parallel to the first and second rows, and is located such that it equally overlaps the first and second row. In this embodiment, the center of each hologram of the fifth set (50) is located approximately one hologram diameter from the center of an adjacent hologram (52) of the fifth set, and also located at approximately the mid-way point of a line connecting the centers of adjacent holograms of the first and third sets, e.g., lines between holograms 10 and 30 and between holograms 12 and 32. A sixth set of holograms 60, 62 is then stored in the third row. The center of each hologram of the sixth set (60) is spaced approximately one hologram diameter from the center of adjacent holograms (62) of the sixth set. And the sixth set of holograms 60, 62 are shifted from perfect alignment with the fifth set 50, 52 of holograms by the offset distance, such that, e.g., the center of each hologram of the sixth set is located directly above the mid-way point of a line connecting the centers of adjacent holograms of the second and fourth sets. (It is possible for the holograms of the fifth and sixth set to be located other than at these mid-way points, depending on the particular holographic system, e.g., depending on the tradeoff between speed and uniformity. It is also possible for the spacing between adjacent rows to be closer than one hologram diameter.) Again, it is possible to form additional sets of holograms in the third row, and also to form similar rows that equally-span or overlap previously-formed rows.

To fill a medium with holograms, the holograms are typically stored in distinct sections of the medium, e.g., the medium is virtually separated into sectors. A variety of rows are capable of being formed, depending on, for example, the particular system, multiplexing technique, and medium. Generally, there is no overlap between holograms of the distinct sections. In addition, for square or rectangular media, dummy holograms are typically stored along the edges (at opposite ends of the substantially linear rows), i.e., holograms with no data, because the background shrinkage and exposure are generally not uniform enough at these edges to provide sufficient signal to noise ratio.

As noted above, by performing this storage technique, the background for each subsequent set stored in a given row becomes relatively stable, compared to more conventional storage techniques. Specifically, the typically unavoidable polymeric shrinkage has taken place relatively uniformly across the row due to the non-overlap (or controlled overlap) of the previously-stored set of holograms.

The offset distance is typically an integer multiple of the spatial multiplexing shift desired in the completed recording medium. The actual offset distance will vary depending on the selectivity of the particular holography method, e.g., shift multiplexing vs. aperture multiplexing, and selection of the distance is within the skill of an ordinary artisan (and is less than one hologram diameter). Typically, holograms are stored relatively closely, e.g., a few microns offset, when overlapping in the direction that lies in the plane defined by the signal and reference beams. Larger offset, again determined by the multiplexing technique, is generally provided where the overlap is in the out-of-plane direction, e.g., one-third to one-half of the hologram width for aperture multiplexing.

The hologram width is referred to below as "W" and the center of the hologram should be construed as a point at ½ W. These dimensions may be viewed as either width or height and, in the case of circular holograms, W is the diameter and ½ W refers to the radius of the circle.

The storage techniques of the invention are particularly useful for addressing the shrinkage typically encountered with photopolymer-type media, as noted above. A variety of such photopolymer media are known to those skilled in the art. See, e.g., co-assigned U.S. Pat. No. 5,874,187, patent application Ser. No. 08/698511 (our reference Colvin 2-8-3-19-11-10), and patent application Ser. No. 09/046822 (our reference Dhar 1-6-24-15-2).

As noted above, the storage techniques of the invention are useful with a variety of spatial multiplexing techniques, such as shift multiplexing, aperture multiplexing, or phase correlation multiplexing.

Figure 3A:
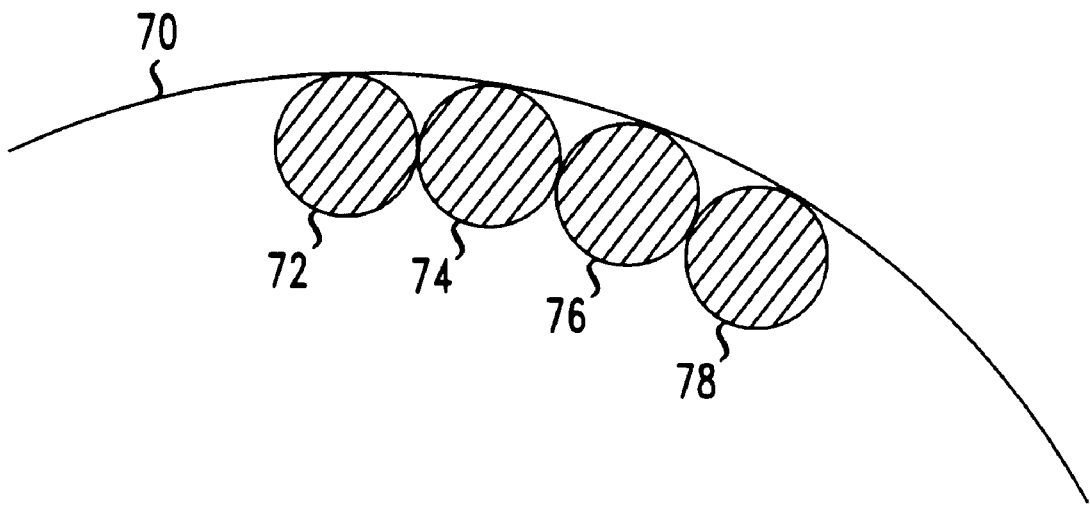
FIGS. 3A–3B illustrate an embodiment of the invention.
Figure 3B:
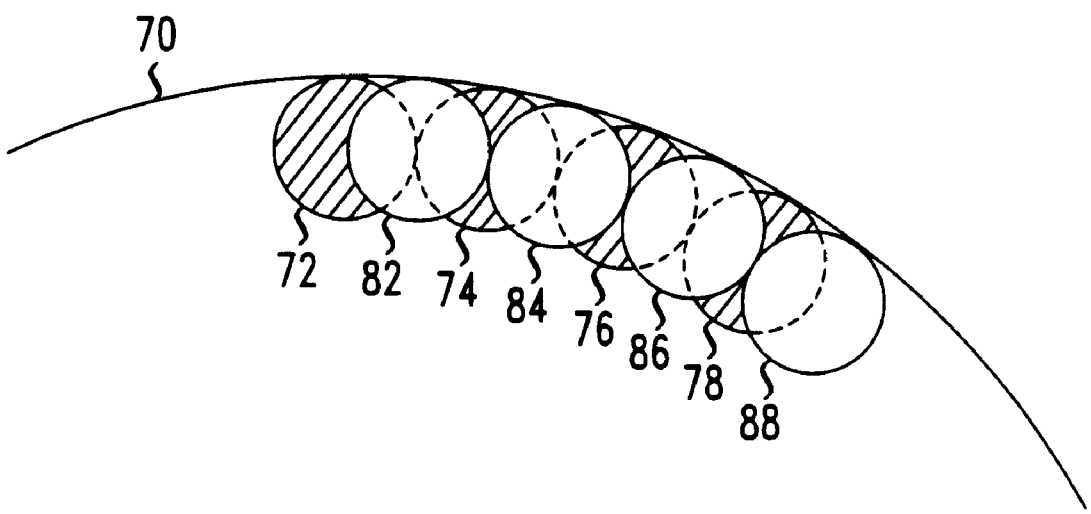

In another aspect of the invention, reflected in FIGS. 3A and 3B, holograms are stored in a disk-shaped medium 70, e.g., a rotating disk. As in the above embodiment, a first set of holograms 72, 74, 76, 78 are stored in a substantially planar first row, along an arc, such that each hologram just touches the next, i.e., the centers of adjacent holograms are located approximately one hologram diameter apart. Then, as shown in FIG. 3B, a second set of holograms 82, 84, 86, 88 are also stored in the first row. The second set 82, 84, 86, 88 is shifted from perfect alignment with the first set of holograms 72, 74, 76, 78 by an offset distance, which is determined as discussed above. It is possible to form additional sets of holograms in the first row, each set shifted from the perfect alignment with the previous set by the offset distance.

Figure 4A:
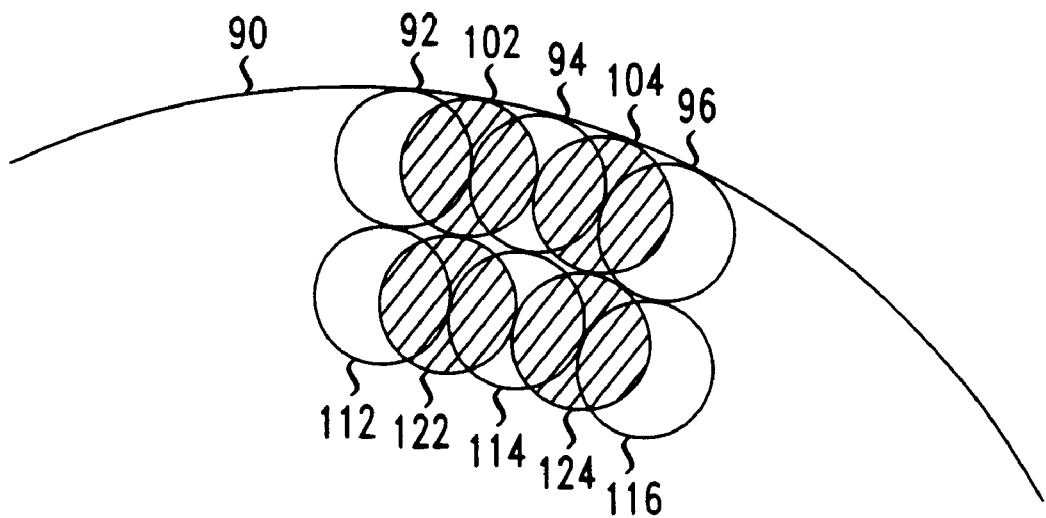
FIGS. 4A–4B illustrate an embodiment of the invention.
Figure 4B:
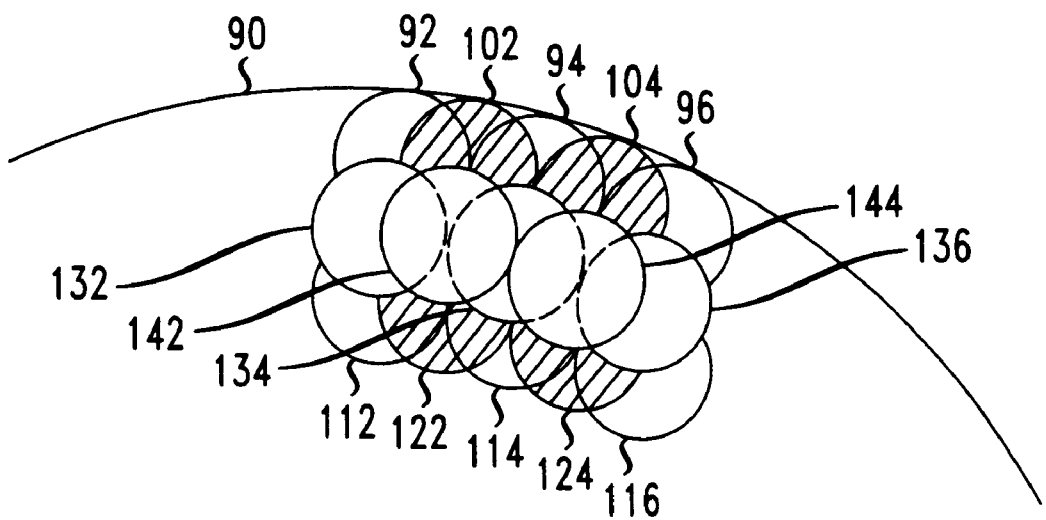

FIGS. 4A and 4B shows storage of several rows of holograms on a disk-type medium 90. The first set of holograms 92, 94, 96, and the second set of holograms 102, 104 are stored as discussed in the previous paragraph. Then a third set of holograms 112, 114, 116 are formed in a substantially planar second row adjacent to the first row. As in the first embodiment above, the third set is arranged such that the center of each hologram (112) is approximately one hologram diameter from adjacent holograms of the third set (114), and also approximately one hologram diameter from the center of an adjacent hologram (92) of the first set. The fourth set of holograms 122, 124 is then stored in the second row, but shifted from perfect alignment with the third set of holograms by the offset distance.

Once the desired number of adjacent rows are formed, e.g., as in 4A, it is possible to form overlapping rows. For example, fifth and sixth sets of holograms are capable of being stored as shown in FIG. 4B. The fifth set of holograms 132, 134, 136 is stored in a third row that is substantially planar with the first and second rows, and equally overlaps the first and second rows (equally meaning that the amount of the third row holograms extending into the first row is approximately the same as the amount extending into the second row). The center of each hologram of the fifth set (132) is spaced approximately one hologram diameter from the center of an adjacent hologram (134) of the fifth set, and directly above the mid-way point of a line connecting the centers of adjacent holograms of the first and third sets, e.g., lines between holograms 92 and 112 or holograms 94 and 114. A sixth set of holograms 142, 144 is then stored in the third row. The center of each hologram of the sixth set (142) is spaced approximately one hologram diameter from the center of adjacent holograms (144) of the sixth set. And the sixth set of holograms are shifted from perfect alignment with the fifth set of holograms by the same offset distance.

The remainder of a disk-type medium is typically filled in the same manner discussed above, i.e., by sectors, where the sectors are typically rings. Again, the number of rows capable of being formed in each sector is a matter of design choice.

Other embodiments of the invention will be apparent to those skilled in the art from consideration of the specification and practice of the invention disclosed herein.

What is claimed is:

1. A process for holography, comprising the steps of:
   (a) providing a photopolymer-type holographic storage medium;
   (b) storing a first set of holograms in a first portion of said medium, wherein the holograms in the set have a width W and the center of each hologram of the first set is spaced from the center of adjacent holograms of the first set by a distance of at least the hologram width W; and thereafter
   (c) storing a second set of holograms in said first portion of said medium, wherein the second set of holograms overlaps the first set and is shifted from perfect alignment with the first set of holograms by an offset distance,
wherein the storage is performed by a spatial multiplexing technique.

2. The process of claim 1, further comprising the subsequent steps of:
   (d) storing a third set of holograms in a second portion of said medium, wherein the center of each hologram of the third set is spaced approximately one hologram width from the center of an adjacent hologram of the first set and is spaced from the center of adjacent holograms of the third set by a distance of at least 2% of the hologram width; and thereafter
   (e) storing a fourth set of holograms in said second portion of said medium, wherein the fourth set of holograms overlaps the third set and is shifted from perfect alignment with the third set of holograms by an offset distance, and wherein the center of each hologram of the fourth set is spaced approximately one hologram width from the center of an adjacent hologram of the second set and is spaced from the center of adjacent holograms of the fourth set by a distance of at least 2% of the hologram width.

3. The process of claim 2, wherein the center of each hologram of the first set is spaced from the center of adjacent holograms of the first set by a distance of approximately one hologram width, wherein the center of each hologram of the second set is spaced from the center of adjacent holograms of the second set by a distance of approximately one hologram width, wherein the center of each hologram of the third set is spaced from the center of adjacent holograms of the third set by a distance of approximately one hologram width, and wherein the center of each hologram of the fourth set is spaced from the center of adjacent holograms of the fourth set by a distance of approximately one hologram width.

4. The process of claim 2, further comprising the steps of:
   (d) storing a fifth set of holograms in a third portion of said medium, wherein the third portion of said medium overlaps both the second portion and the first portion, and wherein the center of each hologram is spaced from the center of adjacent holograms of the fifth set by a distance of at least 2% of the hologram width; and thereafter
   (e) storing a sixth set of holograms in said third portion of said medium, wherein the sixth set of holograms overlaps the fifth set and is shifted from perfect alignment with the fifth set of holograms by an offset distance, and wherein the center of each hologram of the sixth set is spaced from the center of adjacent holograms of the sixth set by a distance of at least 2% of the hologram width.

5. The process of claim 4, wherein the third portion of the medium equally overlaps the second and first portions of the medium.

6. The process of claim 4, wherein the center of each hologram of the first set is spaced from the center of adjacent holograms of the first set by a distance of approximately one hologram width, wherein the center of each hologram of the second set is spaced from the center of adjacent holograms of the second set by a distance of approximately one hologram width, wherein the center of each hologram of the third set is spaced from the center of adjacent holograms of the third set by a distance of approximately one hologram width, wherein the center of each hologram of the fourth set is spaced from the center of adjacent holograms of the fourth set by a distance of approximately one hologram width, wherein the center of each hologram of the fifth set is spaced from the center of adjacent holograms of the fifth set by a distance of approximately one hologram width, and wherein the center of each hologram of the sixth set is spaced from the center of adjacent holograms of the sixth set by a distance of approximately one hologram width.

7. The process of claim 6, wherein the third region in the medium equally overlaps the first and second regions.

8. The process of claim 1, wherein the medium comprises a material selected from the group consisting of photoactive monomers, photoactive oligomers, and photoactive polymers.

9. The process of claim 1, wherein the holograms are stored by a spatial multiplexing technique selected from the group consisting of shift multiplexing, aperture multiplexing, and phase correlation multiplexing.

10. The process of claim 1, wherein the first, second, third, and fourth sets of holograms comprise dummy holograms.

11. The process of claim 1 wherein the first and second sets of holograms are in linear rows.

* * * * *